United States Patent
Wagle et al.

(10) Patent No.: US 10,655,050 B1
(45) Date of Patent: *May 19, 2020

(54) METHOD AND MATERIALS TO CONVERT A DRILLING MUD INTO A SOLID GEL BASED LOST CIRCULATION MATERIAL

(71) Applicant: Saudi Arabian Oil Company, Dhahran (SA)

(72) Inventors: Vikrant Wagle, Abqaiq (SA); Rajendra Arunkumar Kalgaonkar, Abqaiq (SA); Abdullah Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,503

(22) Filed: Feb. 21, 2019

(51) Int. Cl.
| | |
|---|---|
| *E21B 33/13* | (2006.01) |
| *E21B 43/22* | (2006.01) |
| *C09K 8/508* | (2006.01) |
| *C09K 8/06* | (2006.01) |
| *E21B 21/00* | (2006.01) |
| *C09K 8/504* | (2006.01) |

(52) U.S. Cl.
CPC .............. *C09K 8/5086* (2013.01); *C09K 8/06* (2013.01); *C09K 8/5045* (2013.01); *E21B 21/003* (2013.01); *C09K 2208/10* (2013.01)

(58) Field of Classification Search
CPC ... C04B 28/02; C04B 24/383; C09K 2208/26; C09K 8/685; C09K 8/035; C09K 8/64; C09K 8/80; C09K 8/68; C09K 8/90; C09K 2208/10; C09K 8/805; C09K 8/82; E21B 43/267; E21B 43/26; E21B 43/25; E21B 43/16; E21B 43/04; E21B 33/138; E21B 33/14

See application file for complete search history.

(56) References Cited

U.S. PATENT DOCUMENTS

| | | | |
|---|---|---|---|
| 3,371,712 A | 3/1968 | Adams | |
| 4,732,213 A | 3/1988 | Bennett et al. | |
| 4,799,549 A * | 1/1989 | Vinot ................. | C09K 8/5045 106/803 |
| 5,320,171 A | 6/1994 | Laramay | |
| 7,013,973 B2 | 3/2006 | Danican et al. | |
| 7,413,013 B2 | 8/2008 | Welton et al. | |
| 7,458,424 B2 | 12/2008 | Odeh et al. | |
| 7,926,567 B2 | 4/2011 | Harris et al. | |
| 7,934,557 B2 | 5/2011 | Nguyen | |
| 7,954,549 B2 | 6/2011 | Lende et al. | |
| 9,045,965 B2 | 6/2015 | Patil et al. | |
| 9,133,386 B2 | 9/2015 | Kumar et al. | |
| 9,388,335 B2 | 7/2016 | Loiseau et al. | |
| 2005/0252659 A1 | 11/2005 | Sullivan et al. | |
| 2010/0016183 A1 | 1/2010 | Roddy et al. | |
| 2011/0094746 A1 | 4/2011 | Allison et al. | |
| 2013/0292120 A1 | 11/2013 | Patil et al. | |
| 2014/0158354 A1 | 6/2014 | Kumar et al. | |
| 2014/0162910 A1 | 6/2014 | Braley et al. | |
| 2014/0174739 A1 | 6/2014 | Bourcier et al. | |
| 2014/0353043 A1 | 12/2014 | Amanullah et al. | |
| 2015/0126415 A1 | 5/2015 | Husein et al. | |
| 2015/0344772 A1 | 12/2015 | Droger et al. | |
| 2016/0107938 A1 | 4/2016 | Mader et al. | |
| 2016/0122618 A1 | 5/2016 | Nguyen et al. | |
| 2016/0122625 A1 | 5/2016 | Singh et al. | |
| 2016/0319185 A1 | 11/2016 | Semenov et al. | |
| 2016/0319188 A1 | 11/2016 | Loiseau et al. | |
| 2016/0347986 A1 | 12/2016 | Nguyen et al. | |
| 2018/0320053 A1 | 11/2018 | Kalgaonkar et al. | |
| 2019/0161668 A1 | 5/2019 | Wagle et al. | |

FOREIGN PATENT DOCUMENTS

| | | |
|---|---|---|
| CN | 105907380 A | 8/2016 |
| WO | 2015041703 A1 | 3/2015 |
| WO | 2015116044 A1 | 8/2015 |
| WO | 2019104301 A1 | 5/2019 |

OTHER PUBLICATIONS

Office Action dated Aug. 7, 2019 pertaining to U.S. Appl. No. 16/281,535, filed Feb. 21, 2019, 14 pgs.
International Search Report and Written Opinion dated Nov. 4, 2019 pertaining to International application No. PCT/US2019/040966 filed Jul. 9, 2019, 19 pgs.
Ghanbari et al. "A facile method for synthesis and dispersion of silica nanoparticles in water-based drilling fluid" Colloid & Polymer Science, Oct. 31, 2015, pp. 381-388, vol. 294, No. 2.
Kang et al. "Strengthening shale wellbore with silica nanopartides drilling fluid" Petroleum, Jun. 1, 2016, pp. 189-195, vol. 2, No. 2.
International Search Report and Written Opinion dated Jan. 21, 2020 pertaining to International application No. PCT/US2019/057125 filed Oct. 21, 2019, 15 pgs.

* cited by examiner

*Primary Examiner* — Zakiya W Bates
(74) *Attorney, Agent, or Firm* — Dinsmore & Shohl LLP

(57) ABSTRACT

A method for controlling loss circulation. The method includes introducing into a wellbore a nanosilica drilling fluid comprising water and an alkaline nanosilica dispersion. The method further includes introducing into the nanosilica drilling fluid an amount of a chemical activator comprising a water soluble hydrolysable polyester to produce a convertible drilling mud where the convertible drilling mud has an initial pH between 8 and 11 upon formation. The method also includes allowing the chemical activator to hydrolyze to produce an acid and reduce the pH of the convertible drilling mud to less than a gel pH, thereby converting the convertible drilling mud into a solid gel lost circulation material. A convertible drilling mud operable to convert into a solid gel lost circulation material is also provided.

20 Claims, 1 Drawing Sheet

METHOD AND MATERIALS TO CONVERT A DRILLING MUD INTO A SOLID GEL BASED LOST CIRCULATION MATERIAL

BACKGROUND

Field

Embodiments of the present disclosure generally relate to compositions and methods for lost circulation control in a subterranean formation.

Technical Background

Fluids used in drilling a wellbore can be lost to the subterranean formation while circulating in the wellbore. The drilling fluid can enter the subterranean formation via depleted zones, zones of relatively low pressure, lost circulation zones having naturally occurring fractures, weak zones having fracture gradients exceeded by the hydrostatic pressure of the drilling fluid, and other openings between the wellbore and the subterranean formation. The extent of fluid loss to the subterranean formation can be greater than 100 barrels per hour (bbl/hr). As a result, the drilling service provided by such fluid is more difficult or costly to achieve. Current loss prevention methods require drilling to be temporarily halted so the drilling fluid can be replaced with a loss circulation pill. Periods of halted drilling directly result in non-productive time and lost revenue.

SUMMARY

There is a continual need for a generation of an effective lost circulation gel without requiring halting or termination of drilling operations to replace the drilling fluid with a loss circulation pill. Disclosed are compositions and methods for lost control in a subterranean formation and specifically compositions and methods for producing a lost circulation material in situ without halting drilling operations for drilling fluid replacement.

According to one embodiment, a method for controlling loss circulation is provided. The method comprises introducing into a wellbore a nanosilica drilling fluid comprising water and an alkaline nanosilica dispersion. The method further comprises introducing into the nanosilica drilling fluid an amount of a chemical activator comprising a water soluble hydrolysable polyester to produce a convertible drilling mud, where the convertible drilling mud has an initial pH between 8 and 11 upon formation. The method also comprises allowing the chemical activator to hydrolyze to produce an acid and reduce the pH of the convertible drilling mud to less than a gel pH, thereby converting the convertible drilling mud into a solid gel lost circulation material.

According to another embodiment, a convertible drilling mud operable to convert into a solid gel lost circulation material is provided. The convertible drilling mud includes a nanosilica drilling fluid and a chemical activator. The nanosilica drilling fluid includes an aqueous based drilling mud and an alkaline nanosilica dispersion. The nanosilica drilling fluid has a pH and a gel pH, and the pH of the nanosilica drilling fluid is greater than the gel pH. The chemical activator has a pH less than 7 and includes a water soluble hydrolysable polyester that is operable to form an acid to react with the nanosilica drilling fluid such that the solid gel lost circulation material forms. Further, the volume ratio of the chemical activator to the alkaline nanosilica dispersion is between 1:1000 and 1:10 before conversion of the convertible drilling mud into the solid gel lost circulation material.

Additional features and advantages of the embodiments described will be set forth in the detailed description which follows, and in part will be readily apparent to those skilled in the art from that description or recognized by practicing the embodiments described, including the detailed description which subsequently follows, and the claims.

BRIEF DESCRIPTION OF THE DRAWINGS

FIG. 1 is a photograph of the solid gel lost circulation material.

DEFINITIONS

In this disclosure, the term "lost circulation zone" refers to an area encountered during drilling operations where the volume of drilling fluid returning to the surface is less than the volume of drilling fluid introduced to the wellbore. The lost circulation zone can be due to any kind of opening between the wellbore and the subterranean formation. Lost circulation zones that can be addressed by convertible drilling mud described here can range from seepage loss to complete fluid loss.

In this disclosure, the term "hydrolysis" or "hydrolyze" refers to a chemical reaction where water reacts with another compound to produce an acid.

In this disclosure, the term "hydrolysis time" or "rate of hydrolysis" refers to the amount of time required to reduce the pH of the convertible drilling mud from the starting pH at which the convertible drilling mud is introduced to the wellbore to the gel pH.

In this disclosure, the term "gel pH" refers to the pH at which the solid gel lost circulation material forms.

In this disclosure, the term "gel time" or "rate of gel formation" refers to the time it takes to form the solid gel lost circulation material from the convertible drilling mud measured as the period from when the gel pH is achieved until the solid gel lost circulation material forms.

In this disclosure, the term "stable" refers to the state where the nanosilica particles are dispersed throughout the alkaline nanosilica dispersion and are not aggregated. Upon destabilization the nanosilica particles aggregate to form a gelled solid.

DETAILED DESCRIPTION

The present disclosure provides a method for controlling loss circulation in a subterranean formation. A well may be drilled with a convertible drilling mud allowing for continued drilling upon encountering a lost circulation zone by converting the in-use convertible drilling mud directly to a treatment fluid for curing the lost circulation. Specifically, the convertible drilling mud of the present disclosure includes an alkaline nanosilica dispersion, which may be converted to a solid gel upon a pH reduction. The solid gel formed in the lost circulation zone may then serve to prevent further fluid loss at the lost circulation zone by acting as a physical barrier.

The convertible drilling mud includes a nanosilica drilling fluid and a chemical activator. The nanosilica drilling fluid includes an aqueous based drilling mud and an alkaline nanosilica dispersion. The chemical activator is operable to hydrolyze to produce an acid such that the nanosilica drilling fluid is destabilized and forms a gelled solid. Advantageously, the convertible drilling mud can be used at elevated temperatures, such as those experienced in a wellbore and a subterranean formation.

The aqueous based drilling mud may be a water-containing fluid capable of use in a well drilling operation. The aqueous based drilling mud can include drilling fluid additives commonly used in drilling fluids. The drilling fluid additives can include viscosifiers, pH control agents, weighting agents, filtration control additives, and combinations of the same.

The alkaline nanosilica dispersion represents a dispersion of nanosilica particles in a dispersion fluid in combination with an alkali, such as NaOH, to stabilize the dispersion. It will be appreciated that salts such as NaCl and KCl may be avoided in the alkaline nanosilica dispersion. The surface charge of the nanosilica particles may be neutralized by soluble salts that ionize and reduce the size of a double layer around the silica surface, which allows for aggregation. As such, maintenance of a minimized salt concentration is sought to ensure retention of the dispersion.

In one or more embodiments, the nanosilica particles in the alkaline nanosilica dispersion may have a particle size between 5 nanometers (nm) and 100 nm. In various further embodiments, the nanosilica particles in the alkaline nanosilica dispersion may have a particle size of between 5 nm and 80 nm, between 20 nm and 80 nm, between 30 nm and 60 nm, or between 40 nm and 50 nm. It will be appreciated that a smaller particle size results in a relatively faster gelling when all other parameters are held constant.

The nanosilica particles may have a greater surface area than silica particles as a result of the smaller particle size. Without being bound to a particular theory, the greater surface area of the nanosilica particles can affect the rate of gelation and the nature of the gels formed. More specifically, the smaller particle size of the nanosilica particles in the alkaline nanosilica dispersion promotes faster gelling than silica particles.

The concentration of the nanosilica particles in the alkaline nanosilica dispersion may range between 5 percent by weight (wt %) and 50 wt %. In one or more embodiments, the alkaline nanosilica dispersion may comprise 10 wt % to 50 wt % nanosilica particles, 20 wt % to 50 wt % nanosilica particles, 30 wt % to 50 wt % nanosilica particles, or 40 wt % to 50 wt % nanosilica particles. In one or more specific embodiments, the alkaline nanosilica dispersion may comprise 43 wt % to 47 wt % nanosilica particles. The concentration of nanosilica in the alkaline nanosilica dispersion may impact the rate of gel formation with a greater concentration of nanosilica in the alkaline nanosilica dispersion correlating to a faster rate of gel formation. The amount of the alkaline nanosilica dispersion added to the aqueous based drilling mud may depend on the mud weight of the aqueous based drilling mud. It will be appreciated that an increase in the mud weight may necessitate a commensurate increase in nanosilica dispersion.

The chemical activator can be any water soluble hydrolysable ester that undergoes hydrolysis. Examples of the water soluble hydrolysable ester include a glycol ester, a polyethylene glycol ester, an alkyl ester, and an ester of a carboxylic acid and an alcohol, and combinations of the same. In one or more embodiments, the chemical activator may comprise ethyl lactate, diethylene glycol diformate, ethyl acetate, ethyl formate, ethylene glycol diacetate, dietheylene glycol dilactate, and combinations of the same. In one or more specific embodiments, the chemical activator is ethyl lactate. The chemical activator may be in the form of powder, beads, aqueous suspension, fibers, and combinations of the same. Advantageously, the chemical activator is chemically neutral until undergoing hydrolysis, such as upon contacting the water in the aqueous based drilling fluid. As such, the chemically neutral chemical activator may be handled at the rig site without special precautions prior to implementation in the convertible drilling mud.

It will be appreciated that upon hydrolysis in an aqueous medium the chemical activator is converted to an acid. Ethyl lactate hydrolyzes in an aqueous medium to form lactic acid. Diethylene glycol diformate hydrolyzes in an aqueous medium to form formic acid. Ethyl acetate hydrolyzes in an aqueous medium to form acetic acid. Ethyl formate hydrolyzes in an aqueous medium to form formic acid. Ethylene glycol diacetate hydrolyzes in an aqueous medium to form acetic acid. Dietheylene glycol dilactate hydrolyzes in an aqueous medium to form lactic acid.

The generated acid from hydrolysis of the chemical activator destabilizes the alkaline nanosilica dispersion to produce a solid gel lost circulation material. The solid gel lost circulation material forms from network structures. The alkaline nanosilica dispersion may be stable at a pH between about 8 to about 12. The stability of the alkaline nanosilica dispersion is due to silica particle repulsion resulting from surface ionization in the alkaline solution. The electrical repulsion between the same charged particles stabilizes the dispersion. Disturbance of the charge balance by reducing the pH to less than the gel pH due to the addition of acid can cause the alkaline nanosilica dispersion to destabilize and aggregate, which results in the formation of the solid gel lost circulation material.

The alkaline nanosilica dispersion within the nanosilica drilling fluid may be selected to obtain a gel pH compatible with the downhole conditions of the lost circulation zone. Specifically, a nanosilica dispersion may be selected such that the convertible drilling mud may be conveyed to the lost circulation zone before the chemical activator and the downhole conditions result in reduction to less than the gel pH. In various embodiments, the gel pH may be less than 7, less than 6, or less than 5. It will be appreciated that a more basic gel pH correlates to an extended period for positioning the convertible drilling mud within the lost circulation zone before formation of the solid gel lost circulation material as greater pH reduction must occur before gelling.

The ratio between the alkaline nanosilica dispersion and the chemical activator in the convertible drilling mud may be between 0.1 percent by volume (activator) of the total volume (nanosilica) (v/v %) to 10 v/v %. The weight ratio between the alkaline nanosilica dispersion and the chemical activator in the convertible drilling mud may alternatively be defined as between 1 to 0.001 and 1 to 0.25. The amount of chemical activator added to the alkaline nanosilica dispersion may be adjusted based on the change in pH required in the nanosilica drilling fluid. A greater required pH change correlates to a greater v/v % or ratio of chemical activator added to the alkaline nanosilica dispersion to generate a greater volume of acid for pH adjustment.

The convertible drilling mud may generally have a pH between 8 and 11 when introduced to the wellbore. The starting pH of the convertible drilling mud may impact the hydrolysis time. For a starting pH less than 7, the gel time may be less than 1 hour. Maintaining a starting pH of the convertible drilling mud between 8 and 11 enables control over the hydrolysis time. Control over the hydrolysis time allows the placement of the convertible drilling mud in the lost circulation zone before the gel pH is achieved as a result of acid generation from hydrolysis of the chemical activator. Controlling the pH may be achieved by varying the concentration of the chemical activator. As the chemical activator hydrolyzes and produces acid, the acid reduces the pH of the convertible drilling mud from the starting pH to the gel pH. Temperature, time of exposure between the chemical activator and the water in the nanosilica drilling fluid, and the molecular weight of the chemical activator impacts the hydrolysis time.

The rate of the hydrolysis of the chemical activator is dependent on the temperature of the chemical activator. Specifically, as the temperature of the chemical activator increases the rate of hydrolysis and conversion to acid increases. As such, the downhole conditions and temperature at the lost circulation zone must be considered when determining a working time to position the convertible drilling fluid at the lost circulation zone before generation of the solid gel lost circulation material. In various embodiments, the hydrolysis time may be between 1 hour and 24 hours, 1 hour and 20 hours, 2 hours and 15 hours, or 3 hours and 10 hours. As the hydrolysis time is dependent on the temperature and pressure conditions experienced downhole, the hydrolysis time can be tuned to account for the wellbore conditions at the depth at which the lost circulation zone is located.

The gel time contributes to the working period to position the convertible drilling mud into the lost circulation zone after mixing of the chemical activator and the nanosilica drilling fluid. Specifically, the working period to position the convertible drilling mud into the lost circulation zone includes the period while the pH of the convertible drilling mud is being reduced to the gel pH as well as the gel time representing the period between the gel pH being reached and formation of the solid gel lost circulation material. In one or more embodiments, the gel time may range between 5 minutes and 24 hours. In various further embodiments, the gel time may range between 30 minutes and 20 hours, 1 hour and 18 hours, 2 hours and 15 hours, and 10 minutes to 10 hours. It will be appreciated that the gel time may be tuned to account for the wellbore conditions at the depth at which the lost circulation zone is located.

It will be appreciated that the downhole temperature may have an effect on the gel time of the alkaline nanosilica dispersion in the convertible drilling fluid. Specifically, it is believed that as the surrounding temperature increases the gel time decreases. Further, it is believed that as the surrounding pressure increases the gel time decreases. Specifically, an electrical repulsion between the same charged particles stabilizes the alkaline nanosilica dispersion and avoids gel formation. Disturbance of the charge balance, by changing the pH for example, can cause the colloidal particles to aggregate and initiate formation of a gel. Increased pressure may increase the rate of aggregation of the silica particles resulting in a decrease in the gel time. As such, the temperature and pressure at the lost circulation zone must be accounted for when preparing the convertible drilling fluid formulation and the volume of chemical activator to utilize.

The solid gel lost circulation material is an irreversible solid gel. The solid gel lost circulation material does not degrade under temperature, pressure or pH conditions once formed. Gel breakers do not break the solid gel lost circulation material either.

As indicated, the nanosilica drilling fluid may include drilling fluid additives including viscosifiers, pH control agents, weighting agents, filtration control additives, and combinations of the same.

The nanosilica drilling fluid may optionally include one or more alkaline compounds for pH adjustment, which may include lime (calcium hydroxide or calcium oxide), soda ash (sodium carbonate), sodium hydroxide (caustic soda), potassium hydroxide, or combinations thereof. It is noted that conjugate bases to acids with a pKa of more than about 13 are considered strong bases. The pH may be maintained within a range in order to minimize corrosion caused by the drilling fluid on steel tubulars, tanks, pumps, and other equipment contacting the drilling fluid as well as to maintain the pH greater than the gel pH prior to introduction of the chemical activator. Additionally, the alkaline compounds may react with gases, such as $CO_2$ or $H_2S$, encountered by the drilling fluid during drilling operations to prevent the gases from hydrolyzing one or more components of the drilling fluid. Some example drilling fluid compositions may optionally include from 0.1 pounds per barrel (lb/bbl) to 10 lb/bbl of alkaline compounds. In some embodiments, the drilling fluid compositions include from 0.1 lb/bbl to 10 lb/bbl of caustic soda, 0.1 lb/bbl to 1 lb/bbl of caustic soda, or 0.1 lb/bbl to 0.5 lb/bbl of caustic soda.

In embodiments, the nanosilica drilling fluid may include a rheology modifier, for example, a viscosifier, to impart non-Newtonian fluid rheology to the nanosilica drilling fluid to facilitate lifting and conveying rock cuttings to the surface of the wellbore and to suspend any weighting material. Examples of viscosifiers may include, but are not limited to, xanthan gum polymer (XC polymer), bentonite, polyacrylamide, polyanionic cellulose, or combinations of these viscosifiers. In some embodiments, the nanosilica drilling fluid may include xanthan gum polymer, which is a polysaccharide secreted by the bacteria *Xanthomonas Campestris* (XC). An example nanosilica drilling fluid may include from 0.1 lb/bbl to 10 lb/bbl of XC polymer, 0.5 lb/bbl to 5 lb/bbl of XC polymer, or 1 lb/bbl to 3 lb/bbl of XC polymer. In another example nanosilica drilling fluid, bentonite may be added to the drilling fluid in an amount from 0.1 lb/bbl to 10 lb/bbl of bentonite, 1 lb/bbl to 8 lb/bbl of bentonite, or 3 lb/bbl to 5 lb/bbl of bentonite. Other suitable viscosifiers may be used in the nanosilica drilling fluid without deviating from the scope of the present subject matter.

In one or more embodiments, filtration control additive may be added to the nanosilica drilling fluid to reduce the amount of filtrate lost from the nanosilica drilling fluid into a subsurface formation. Examples of filtration control additives include organophilic (for example, amine-treated) lignite, bentonite, manufactured polymers, biopolymers, natural polymers, and thinners or deflocculants. In one or more embodiments the filtration control additive may be a polyanionic celluclose such as PAC-R™ which is commercially available from Halliburton Energy Services, Inc. The filtration control additive may also be a starch. The nanosilica drilling fluid may include from 1 lb/bbl to 10 lb/bbl of filtration control additive, from 2 lb/bbl to 8 lb/bbl of filtration control additive, from 3 lb/bbl to 7 lb/bbl of filtration control additive, or from 4 lb/bbl to 5 lb/bbl of filtration control additive.

In further embodiments, additives in the nanosilica drilling fluid may include a weighting material. The weighting material has a density suited for raising the drilling fluid composition density. In some embodiments, the weighting material may be a particulate solid having a density sufficient to increase the density of the drilling fluid composition without adding excessive weighting material such that the nanosilica drilling fluid cannot be circulated through the wellbore. The weighting material may have a density of from 2 grams per cubic centimeter ($g/cm^3$) to 6 $g/cm^3$. Examples of weighting materials include barite (minimum density of 4.20 $g/cm^3$), hematite (minimum density of 5.05 g/cm³), calcium carbonate (minimum desnity of 2.7-2.8 g/cm³), siderite (minimum density of 3.8 g/cm³), ilmenite (minimum desnity of 4.6 g/cm³), or any combination of these weighting materials. Some example nanosilica drilling fluid may include barite as the solid. It will be appreciated that the weight percent of the weighting material in the nanosilica drilling fluid may be 0 to 99 wt. % based on the total weight of the nanosilica drilling fluid to achieve an amount of weighting material sufficient to acquire a particular desired density.

In at least one embodiment of the method for controlling loss circulation, the nanosilica drilling fluid may be utilized to drill a wellbore in a subterranean formation. When a lost circulation zone is encountered, the chemical activator may be mixed with the nanosilica drilling fluid to create the convertible drilling mud. It will be appreciated that the chemical activator can be introduced into the nanosilica drilling fluid while maintaining continuous flow of the nanosilica drilling fluid. The amount of chemical activator introduced into the nanosilica drilling fluid may be adjusted to achieve a desired hydrolysis time.

In one or more embodiments, the nanosilica drilling fluid and the chemical activator are combined at the surface of the wellbore and provided downhole as a single convertible drilling mud. Specifically, the chemical activator may be introduced into the nanosilica drilling fluid to form the convertible drilling mud prior to introduction into the wellbore. During passage from the surface to the lost circulation zone, the chemical activator undergoes the hydrolysis to form an acid and begins the process of converting the convertible drilling mud to the solid gel lost circulation material. As the convertible drilling mud circulates through the wellbore and channels within the subterranean formation toward the lost circulation zone, the chemical activator hydrolyzes to produce the acid. The acid reduces the pH of the convertible drilling mud as the convertible drilling mud circulates to the lost circulation zone. In some embodiments, the pH of the convertible drilling mud is reduced to less than the gel pH prior to positioning in the lost circulation zone resulting in initial formation of the solid gel lost circulation material. In further embodiments, the solid gel lost circulation material may begin to form subsequent to positioning in the lost circulation zone as the pH of the convertible drilling mud is not reduced to less than the gel pH prior to positioning of the convertible drilling mud within the lost circulation zone. The solid gel lost circulation material fills the lost circulation zone or passageways leading to the lost circulation zone to cease lost circulation and prevent further drainage of the microsilica drilling fluid.

In one or more embodiments, the nanosilica drilling fluid and the chemical activator are provided downhole as separate process streams. Specifically, the chemical activator and the nanosilica drilling fluid may be separately introduced into the wellbore, but combined to form the convertible drilling mud prior to introduction into the lost circulation zone. Providing the nanosilica drilling fluid and the chemical downhole as separate process streams may be achieved by pumping the nanosilica drilling fluid through the annulus of the drill string while the chemical activator may be pumped through the drill pipe. It will be appreciated that the nanosilica drilling fluid may instead be pumped through the drill pipe and the chemical activator may instead be pumped through the annulus. As such, conversion of the convertible drilling mud into the solid gel lost circulation material is initiated prior to introduction into the lost circulation zone. Similarly, to embodiments in which the convertible drilling mud is formed prior to introduction into the wellbore, the convertible drilling mud can circulate through the wellbore and channels within the subterranean formation to the lost circulation zone positioned downstream of the mixing point of the nanosilica drilling fluid and chemical activator. As the convertible drilling mud circulates through the wellbore and channels within the subterranean formation toward the lost circulation zone, the chemical activator hydrolyzes to produce the acid and reduce the pH of the convertible drilling mud. Providing the constituents of the convertible drilling mud downhole separately allows for positioning at a closer position to the lost circulation zone before initiating the gelling process with hydrolysis of the chemical activator. As with embodiments in which the convertible drilling mud is formed prior to introduction into the wellbore, the pH of the convertible drilling mud may reduced to less than the gel pH prior to positioning in the lost circulation zone or subsequent to positioning in the lost circulation zone. Upon formation, the solid gel lost circulation material fills the lost circulation zone or passageways leading to the lost circulation zone to cease lost circulation and prevent further drainage of the microsilica drilling fluid.

The location of conversion to the solid gel lost circulation material may be determined based on calculations involving the volume of the nanosilica drilling fluid, the pump rate, and the distance between the lost circulation zone and the surface or mixing point of the nanosilica drilling fluid and chemical activator. Further, it will be appreciated that when the convertible drilling mud reaches the lost circulation zone, circulation can be temporarily terminated so as to allow the convertible drilling mud to gel in the lost circulation zone.

In one or more embodiments, when a lost circulation zone is encountered, a pill of the convertible drilling mud is produced by mixing the nanosilica drilling fluid and the chemical activator. The introduction of the nanosilica drilling fluid may be temporarily suspended with introduction of the convertible drilling mud pill into the wellbore. The pill of the convertible drilling mud may be allowed to migrate to the lost circulation zone. The pill of the convertible drilling mud may be followed by a slug or pill of the nanosilica drilling fluid. The volume of the pill of the convertible drilling mud may be based on the size of the lost circulation zone. It will be appreciated that the size of the lost circulation zone may be estimated based on the volume of lost drilling fluid. Further, the amount of chemical activator may be based on the desired hydrolysis time. As the pill of the convertible drilling mud migrates to the lost circulation zone, the chemical activator hydrolyzes to produce the acid and reduce the pH of the pill of the convertible drilling mud. The solid gel lost circulation material forms in the lost circulation zone when the pH of the pill of the convertible drilling mud is less than the gel pH. The solid gel lost circulation material fills the lost circulation zone. Advantageously, the chemical activator and the alkaline nanosilica dispersion do not precipitate from the aqueous based drilling mud, which allows for the convertible drilling mud to be introduced to the wellbore as a single pill.

In one or more embodiments, the chemical activator may be combined with the nanosilica drilling fluid within the lost circulation zone. Upon encountering a lost circulation zone with the nanosilica drilling fluid, the nanosilica drilling fluid will naturally flood the lost circulation zone. A slug or pill of the chemical activator may be provided to the lost circulation zone to form the convertible drilling mud within the lost circulation zone. It will be appreciated that when the slug or pill of the chemical activator reaches the lost circulation zone and mixes with the nanosilica drilling fluid to form the convertible drilling mud, drilling and introduction of further drilling fluid can be temporarily terminated so as to allow the convertible drilling mud to gel in the lost circulation zone.

EXAMPLE

Nanosilica Drilling Fluid Composition

A nanosilica drilling fluid was prepared as a 74.8 pounds per cubic foot (pcf) nanosilica drilling fluid representing Example 1. To prepare the nanosilica drilling fluid, four lb/bbl of bentonite was prehydrated in 142.8 lb/bbl water for 16 hours and then mixed for 20 minutes (min). Additives were then added to the water/bentonite mixture according to the order and formulation listed in Table 1 to form the nanosilica drilling fluid.

TABLE 1

Formulation of nanosilica drilling fluid in Example 1.

| Component | Mixing time (min) | Amount (lb/bbl) |
|---|---|---|
| Water | — | 142.8 |
| Bentonite | 20 | 4 |
| XC polymer (biopolymer viscosifier) | 5 | 2 |
| Pre-gelatinized corn starch (filtration control additive) | 5 | 4 |
| PAC-R ™ (filtration control additive) | 5 | 0.5 |
| Caustic soda (pH control agent) | 5 | 0.25 |
| Alkaline nanosilica dispersion | 5 | 265.81 |

For purposes of preparing Example 1, the alkaline nanosilica dispersion was obtained commercially as IDISIL® SI 4545 from Evonik Industries (Essen, Germany); the properties are set forth in Table 2. The PAC-R™ was obtained commercially from Halliburton (Houston, Tex.).

TABLE 2

Properties of alkaline nanosilica dispersion

| Property | Value |
|---|---|
| Particle size - Titrated (nm) | 45 |
| Percent (%) SiO$_2$ | 45 |
| pH @ 25 degrees Celsius (° C.) | 9-11 |
| Density (g/cm$^3$) | 1.32 |
| Viscosity @ 25° C. (centipoise (cP)) | 30 |
| Visual Appearance | white/off-white |

For determination of the rheological and filtration properties of Example 1, the 74.8 pcf nanosilica drilling fluid (Example 1) was initially hot rolled for 16 hours at 200° F. (93.33° C.) in an aging cell. After hot rolling for 16 hours, the nanosilica drilling fluid was allowed to cool in the aging cell and then was transferred from the aging cell to a mud cup. The nanosilica drilling fluid was then mixed for about 5 min in the mud cup after which rheological and filtration properties were measured. The rheological properties were measured using a Fann 35 rheometer. The rheological measurements before hot rolling and after hot rolling are shown in Table 3.

TABLE 3

Rheological and filtration properties of the 74.8 pcf nanosilica drilling fluid of Example 1

| Rheology at 120° F. | Before Hot Rolling (BHR) | After Hot Rolling (AHR) |
|---|---|---|
| 600 revolutions per minute (rpm) | 95 | 62 |
| 300 rpm | 74 | 42 |
| 200 rpm | 63 | 32 |
| 100 rpm | 49 | 21 |
| 6 rpm | 22 | 4 |
| 3 rpm | 18 | 2 |
| Plastic viscosity (cP) | 21 | 20 |
| Yield point (pounds per 100 square feet (lb/100 ft$^2$)) | 53 | 22 |
| 10 sec. Gel Strength (lb/100 ft$^2$) | 21 | 5 |
| 10 min. Gel Strength (lb/100 ft$^2$) | 26 | 12 |
| pH | 9.35 | 9.04 |
| API fluid loss, 30 min (ml) | | 5 |

The nanosilica drilling fluid after hot rolling was demonstrated as stable. The nanosilica drilling fluid of Example 1 had a yield point value of 22 lb/100 ft$^2$ and an API fluid loss, 30 min, of 5 ml after hot rolling. A drilling fluid having a yield point between 10 and 30 lb/100 ft$^2$ is considered to be acceptable for industrial application. If the yield point is less than 10 the drilling fluid may not have sufficient cuttings carrying capacity, which may result in a stuck pipe. Also, for fluids having a density greater than 120 pcf in which barite is used as the weighting agent, the fluid may not have the capacity to suspend barite resulting in barite sag. Further, a drilling fluid having an API fluid loss, 30 min, of less than 10 ml is considered to be acceptable for industrial application. An elevated API fluid loss equates to greater drilling fluid being lost to the formation, requiring a greater amount of drilling fluid to drill the well.

Convertible Drilling Mud

A convertible drilling mud was prepared representing Example 2. To prepare the convertible drilling mud, 5 grams (g) of the chemical activator was added to 350 ml of the nanosilica drilling fluid prepared as Example 1 in a mud cup. The specific chemical activator used was ethyl lactate. The ethyl lactate and nanosilica drilling fluid were mixed for 5 minutes using a multimixer. The convertible drilling mud was then statically aged in a vertical position at 250° F. (121.11° C.) and 1000 pounds per square inch (psi) for 16 hours. After 16 hours of static aging, the convertible drilling mud was converted to the solid gel lost circulation material as shown in FIG. 1.

It should be understood that the various aspects of the convertible drilling mud and the method for producing a solid gel lost circulation material using the same are described and such aspects may be utilized in conjunction with various other aspects.

In a first aspect, the disclosure provides a method for controlling loss circulation. The method comprises the step of introducing into a wellbore a nanosilica drilling fluid comprising water and an alkaline nanosilica dispersion. The method also comprises the step of introducing into the nanosilica drilling fluid an amount of a chemical activator comprising a water soluble hydrolysable polyester to produce a convertible drilling mud, where the convertible drilling mud has an initial pH between 8 and 11 upon formation. The method further comprises allowing the chemical activator to hydrolyze to produce an acid and reduce the pH of the convertible drilling mud to less than a gel pH, thereby converting the convertible drilling mud into a solid gel lost circulation material.

In a second aspect, the disclosure provides the method of the first aspect, in which where the method further comprises drilling a wellbore until a lost circulation zone is encountered, where the lost circulation zone occurs when a flow rate of the nanosilica drilling fluid introduced into the wellbore is less than a flow rate of the nanosilica drilling fluid returning from the wellbore.

In a third aspect, the disclosure provides the method of the first or second aspects, in which the introducing into a wellbore step further comprises introducing the nanosilica drilling fluid into a lost circulation zone.

In a fourth aspect, the disclosure provides the method the third aspect, in which the method further comprises introducing the chemical activator into the nanosilica drilling fluid positioned within the lost circulation zone, thereby allowing the solid gel lost circulation material to fill the lost circulation zone.

In a fifth aspect, the disclosure provides the method of the first or second aspects, in which the convertible drilling mud is formed prior to introduction into a lost circulation zone.

In a sixth aspect, the disclosure provides the method of the fifth aspect, in which the chemical activator is introduced into the nanosilica drilling fluid prior to introduction into the wellbore such that conversion of the convertible drilling mud into the solid gel lost circulation material is initiated prior to introduction into the wellbore.

In a seventh aspect, the disclosure provides the method of the fifth aspect, in which the chemical activator and the nanosilica drilling fluid are separately introduced into the wellbore and combined to form the convertible drilling mud prior to introduction into the lost circulation zone such that conversion of the convertible drilling mud into the solid gel lost circulation material is initiated prior to introduction into the lost circulation zone.

In an eighth aspect, the disclosure provides the method of any of the first through seventh aspects, in which the water soluble hydrolysable polyester comprises at least one of a glycol ester, a polyethylene glycol ester, an alkyl ester, and an ester of a carboxylic acid and an alcohol.

In a ninth aspect, the disclosure provides the method of any of the first through seventh aspects, in which the water soluble hydrolysable polyester is selected from the group consisting of ethyl lactate, diethylene glycol diformate, ethyl acetate, ethyl formate, ethylene glycol diacetate, dietheylene glycol dilactate, and combinations of the same.

In a tenth aspect, the disclosure provides the method of any of the first through seventh aspects, in which the water soluble hydrolysable polyester is ethyl lactate In an eleventh aspect, the disclosure provides the method of any of the first through tenth aspects, in which the amount of the chemical activator introduced into the nanosilica drilling fluid is operable to maintain a volume ratio of the chemical activator to the alkaline nanosilica dispersion of between 1:1000 and 1:10.

In a twelfth aspect, the disclosure provides the method of any of the first through eleventh aspects, in which the gel pH is less than 6.

In a thirteenth aspect, the disclosure provides the method of the twelfth aspect, in which the acid is operable to reduce the pH of the convertible drilling mud to less than 6.

In a fourteenth aspect, the disclosure provides the method of any of the first through thirteenth aspects, in which a gel time is between 5 minutes and 10 hours.

In a fifteenth aspect, the disclosure provides the method of any of the first through fourteenth aspects, in which the gel pH is achieved after a hydrolysis time, where the hydrolysis time is between 1 hour and 24 hours.

In a sixteenth aspect, the disclosure provides the method of any of the first through fifteenth aspects, in which introduction of the nanosilica drilling fluid is terminated upon positioning of the convertible drilling mud in the lost circulation zone to allow conversion of the convertible drilling mud into the solid gel lost circulation material within the lost circulation zone.

In a seventeenth aspect, the disclosure provides a convertible drilling mud operable to convert into a solid gel lost circulation material. The convertible drilling mud comprises a nanosilica drilling fluid and a chemical activator. The nanosilica drilling fluid comprises an aqueous based drilling mud and an alkaline nanosilica dispersion, where the nanosilica drilling fluid has a pH and a gel pH, and where the pH of the nanosilica drilling fluid is greater than the gel pH. The chemical activator comprises a water soluble hydrolysable polyester that is operable to form an acid to react with the nanosilica drilling fluid such that the solid gel lost circulation material forms. Further, the chemical activator has a pH less than 7 and the volume ratio of the chemical activator to the alkaline nanosilica dispersion is between 1:1000 and 1:10 before conversion of the convertible drilling mud into the solid gel lost circulation material.

In an eighteenth aspect, the disclosure provides the convertible drilling mud of the seventeenth aspect, in which the water soluble hydrolysable polyester comprises at least one of a glycol ester, a polyethylene glycol ester, an alkyl ester, and an ester of a carboxylic acid and an alcohol.

In a nineteenth aspect, the disclosure provides the convertible drilling mud of the seventeenth or eighteenth aspects, in which the nanosilica drilling fluid has a pH between 8 and 11.

In a twentieth aspect, the disclosure provides the convertible drilling mud of any of the seventeenth through nineteenth aspects, in which the gel pH is greater than 3 but less than 8.

It should be apparent to those skilled in the art that various modifications and variations can be made to the embodiments described throughout the present disclosure without departing from the spirit and scope of the claimed subject matter. Thus it is intended that the specification cover the modifications and variations of the various embodiments described throughout the present disclosure, provided such modification and variations come within the scope of the appended claims and their equivalents.

The various elements described can be used in combination with all other elements described here unless otherwise indicated.

The singular forms "a", "an" and "the" include plural referents, unless the context clearly dictates otherwise.

"Optional" or "optionally" means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

What is claimed is:

1. A method for controlling loss circulation, the method comprising the steps of:

introducing into a wellbore a nanosilica drilling fluid comprising water and an alkaline nanosilica dispersion;

introducing into the nanosilica drilling fluid an amount of a chemical activator comprising a water soluble hydrolysable polyester to produce a convertible drilling mud, where the convertible drilling mud has an initial pH between 8 and 11 upon formation; and allowing the chemical activator to hydrolyze to produce an acid and reduce the pH of the convertible drilling mud to less than a gel pH, thereby converting the convertible drilling mud into a solid gel lost circulation material.

2. The method of claim 1, where the method further comprises drilling a wellbore until a lost circulation zone is encountered, where the lost circulation zone occurs when a flow rate of the nanosilica drilling fluid introduced into the wellbore is less than a flow rate of the nanosilica drilling fluid returning from the wellbore.

3. The method of claim 1, where the introducing into a wellbore step further comprises introducing the nanosilica drilling fluid into a lost circulation zone.

4. The method of claim 3, where the method further comprises introducing the chemical activator into the nanosilica drilling fluid positioned within the lost circulation zone, thereby allowing the solid gel lost circulation material to fill the lost circulation zone.

5. The method of claim 3, where introduction of the nanosilica drilling fluid is terminated upon positioning of the convertible drilling mud in the lost circulation zone to allow conversion of the convertible drilling mud into the solid gel lost circulation material within the lost circulation zone.

6. The method of claim 1, where the convertible drilling mud is formed prior to introduction into a lost circulation zone.

7. The method of claim 6, where the chemical activator is introduced into the nanosilica drilling fluid prior to introduction into the wellbore such that conversion of the convertible drilling mud into the solid gel lost circulation material is initiated prior to introduction into the wellbore.

8. The method of claim 6, where the chemical activator and the nanosilica drilling fluid are separately introduced into the wellbore and combined to form the convertible drilling mud prior to introduction into the lost circulation zone such that conversion of the convertible drilling mud into the solid gel lost circulation material is initiated prior to introduction into the lost circulation zone.

9. The method of claim 1, where the water soluble hydrolysable polyester comprises at least one of a glycol ester, a polyethylene glycol ester, an alkyl ester, and an ester of a carboxylic acid and an alcohol.

10. The method of claim 1, where the water soluble hydrolysable polyester is selected from the group consisting of ethyl lactate, diethylene glycol diformate, ethyl acetate, ethyl formate, ethylene glycol diacetate, dietheylene glycol dilactate, and combinations of the same.

11. The method of claim 1, where the water soluble hydrolysable polyester is ethyl lactate.

12. The method of claim 1, where the amount of the chemical activator introduced into the nanosilica drilling fluid is operable to maintain a volume ratio of the chemical activator to the alkaline nanosilica dispersion of between 1:1000 and 1:10.

13. The method of claim 1, where the gel pH is less than 6.

14. The method of claim 13, where the acid is operable to reduce the pH of the convertible drilling mud to less than 6.

15. The method of claim 1, where a gel time is between 5 minutes and 10 hours.

16. The method of claim 1, where the gel pH is achieved after a hydrolysis time, where the hydrolysis time is between 1 hour and 24 hours.

17. A convertible drilling mud operable to convert into a solid gel lost circulation material, the convertible drilling mud comprising:

a nanosilica drilling fluid, the nanosilica drilling fluid comprising:
an aqueous based drilling mud; and
an alkaline nanosilica dispersion, where the nanosilica drilling fluid has a pH and a gel pH, and where the pH of the nanosilica drilling fluid is greater than the gel pH; and a chemical activator, the chemical activator comprising:
a water soluble hydrolysable polyester that is operable to form an acid to react with the nanosilica drilling fluid such that the solid gel lost circulation material forms,
where the chemical activator has a pH less than 7; and
where the volume ratio of the chemical activator to the alkaline nanosilica dispersion is between 1:1000 and 1:10 before conversion of the convertible drilling mud into the solid gel lost circulation material.

18. The convertible drilling mud of claim 17, where the water soluble hydrolysable polyester comprises at least one of a glycol ester, a polyethylene glycol ester, an alkyl ester, and an ester of a carboxylic acid and an alcohol.

19. The convertible drilling mud of claim 17, where the nanosilica drilling fluid has a pH between 8 and 11.

20. The convertible drilling mud of claim 17, where the gel pH is greater than 3 but less than 8.

* * * * *